United States Patent
Janay et al.

[11] Patent Number: 5,812,127
[45] Date of Patent: *Sep. 22, 1998

[54] SCREEN IDENTIFICATION METHODOLOGIES

[76] Inventors: Gad Janay, 33 Maiden La. 9th Floor; Todd Yampel, 33 Maiden La., both of New York, N.Y. 10038

[ * ] Notice: The term of this patent shall not extend beyond the expiration date of Pat. No. 5,530,961.

[21] Appl. No.: 722,583

[22] Filed: Oct. 15, 1996

Related U.S. Application Data

[63] Continuation of Ser. No. 659,920, Jun. 7, 1996, which is a continuation of Ser. No. 231,373, Apr. 21, 1994, Pat. No. 5,530,961.

[51] Int. Cl.[6] .................................................. G06F 3/00
[52] U.S. Cl. ........................ 345/333; 345/332; 345/329
[58] Field of Search ................................... 345/329, 330, 345/331, 332, 333, 334, 340; 707/506

[56] References Cited

U.S. PATENT DOCUMENTS

| | | | |
|---|---|---|---|
| 5,179,700 | 1/1993 | Aihara et al. | 345/326 |
| 5,235,654 | 8/1993 | Anderson et al. | 382/180 |
| 5,241,651 | 8/1993 | Ueda | 706/52 |
| 5,361,393 | 11/1994 | Rosillo | 395/651 |
| 5,442,771 | 8/1995 | Filepp et al. | 395/200.49 |
| 5,444,841 | 8/1995 | Glaser et al. | 707/506 |
| 5,450,538 | 9/1995 | Glaser et al. | 707/508 |
| 5,495,567 | 2/1996 | Iizawa et al. | 345/334 |
| 5,530,961 | 6/1996 | Janay et al. | 345/334 |
| 5,724,530 | 3/1998 | Stein et al. | 345/329 |

*Primary Examiner*—Raymond J. Bayerl
*Assistant Examiner*—X. L. Bautista

[57] ABSTRACT

A technique for recognizing screens of information on the personal computer is disclosed wherein data relevant to the screen downloaded from a mainframe is analyzed by the personal computer in order to identify the particular screen.

9 Claims, 3 Drawing Sheets

TRANSACTION RECORD

NAME / ADDRESS

TYPE / SHIP DATE

QTY / METHOD

FIG. 2

SCREEN IDENTIFICATION METHODOLOGIES

This application is a continuation of application Ser. No. 08/659,920 filed Jun. 7, 1996, which is a continuation of Ser. No. 08/231,373 filed Apr. 21, 1994, now U.S. Pat. No. 5,530,961.

TECHNICAL FIELD

This invention relates to computer data entry, and more specifically, to an improved technique of allowing terminal emulators to interface with an end user and a mainframe computer.

BACKGROUND OF THE INVENTION

Typically, large mainframe computers can support a plurality of users. A typical scenario involves a mainframe computer with a plurality of "dumb" terminals connected thereto. The terminals are connected via wiring or a local area network (LAN) to the mainframe computer. The mainframe can typically support simultaneous use by a large number of users.

Recently, it has become commonplace to replace the dumb terminals with personal computers. A personal computer includes software and hardware to emulate a dumb terminal, so that the mainframe computer operates just as if it were connected to a dumb terminal. Such an arrangement is shown in FIG. 1, where a mainframe 101 is interconnected with PCs 102 through 105 by means of a Local Area Network ("LAN") 106. Alternatively, network 106 may be a wide area network such as the Internet or other similar such network.

Several prior arrangements have been devised in order to allow users of PCs 102 through 105 to customize the presentation, input and other factors related to information flowing between the Pcs 102 to 105 and mainframe 101. For example, screens of data downloaded from mainframe 101 are often reformatted by a program in PC 102 and presented to a user. Such an arrangement is described in U.S. Pat. No. 5,530,961 ("the '961 patent"), assigned to the same assignee as the present patent application.

The arrangement described in the '961 patent, as well as several prior art arrangements, is directed to an industry termed "text-to-graphics conversion." In text to graphics conversion, bit streams representing textual data are reformatted into information suitable for display as part of a graphical user interface. The graphical user interface is much more user friendly, provides additional functionality, and may be customized as the user desires.

Most systems prior to that described in the '961 patent implement a technique whereby the PC reads a header from the screen of information as it is downloaded from the mainframe. The header, or screen ID as it is termed, is then utilized by the PC in order to determine how to format and present the data. However, if the application program downloading the screen of information is changed and the screen ID is not updated accordingly, then the technique does not work.

The system described in the '961 patent is a technique for solving the aforementioned problem. As described in the '961 patent, certain characteristics of the screen layout, not the header or screen ID, are utilized to recognize the screen being downloaded. The characteristics are utilized by the PC to generate a screen ID, and the generated screen ID is used to recognize the screen. By generating the screen ID at the PC, rather than utilizing the screen ID downloaded from the mainframe computer, errors due to changes in the software at the mainframe are avoided.

The aforementioned system is but one technique of solving the above described problem. Accordingly, there remains a need in the art for better techniques for PCs which are emulating dumb terminals to recognize and process information downloaded from a mainframe computer.

SUMMARY OF THE INVENTION

The above and other problems of the prior art are solved and a technical advance is achieved in accordance with the present invention which relates to a system of methodologies for recognizing a screen of information downloaded from a mainframe computer to a personal computer. The techniques utilize various characteristics of the screen layout in order to effectively recognize and display the screen of information on the PC in a customized fashion.

The screen layout is used as a "signature." If the particular software application running on the mainframe computer and downloading the screen of information is altered, such that a different screen of information is downloaded, the system will still work because in analyzing the screen of information, the personal computer will recognize that an alteration has occurred, and will process the information in a default manner. Accordingly, unlike many prior arrangements, an alteration in the application program at the mainframe will not result in incorrect processing and/or display of the screens of information.

BRIEF DESCRIPTION OF THE DRAWINGS

FIG. 2 shows a typical screen display on one of personal computers 102 to 105 of FIG. 1.

DETAILED DESCRIPTION OF THE PREFERRED EMBODIMENT

Figure 1:
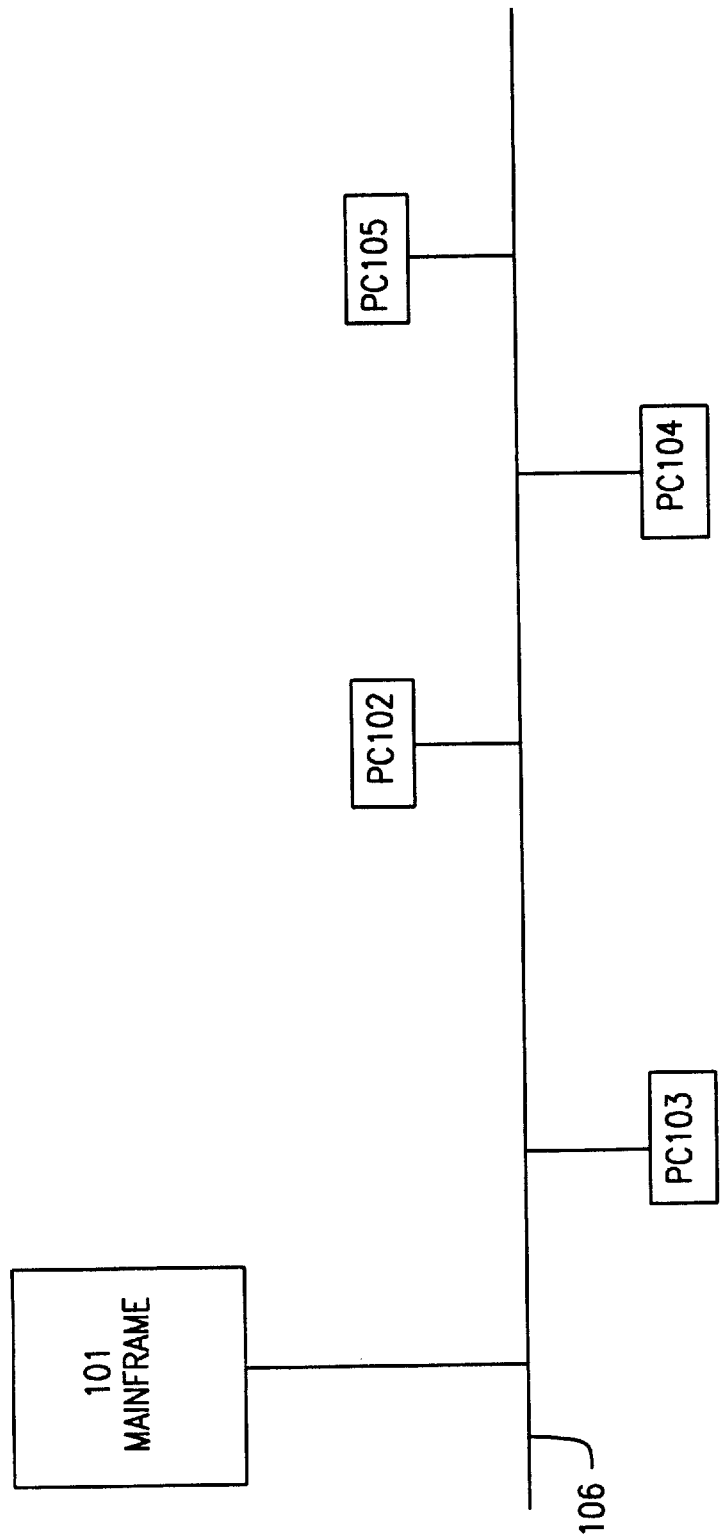
FIG. 1 shows an exemplary LAN with a mainframe and a plurality of PCs connected thereto.

FIG. 1 shows a mainframe computer 101 interconnected via a LAN 106 to four PCs 102 to 105. The Pcs each run software which emulates a dumb terminal, providing a user interface between the mainframe 101 and the end user of the PC.

In operation, data is entered by a user of one of Pcs 102–105 and such data is transmitted to mainframe 101 for use in any of a variety of applications programs running in said mainframe. Additionally, screens of information to be displayed by the mainframe 101 to the end user are transmitted via LAN 106 and received by one or more of Pcs 102–105 which process and display the information in defined formats.

In the commonly owned '961 patent, a technique of recognizing the particular screen at the PC was disclosed. Additionally, it was also disclosed therein to generally utilize characteristics of different types of fields displayed on the PC for screen recognition. As the screens are recognized, they may be displayed to the user in various formats and with various user defined attributes. FIG. 2 shows an exemplary screen displayed on one of Pcs 102–105.

Figure 3:
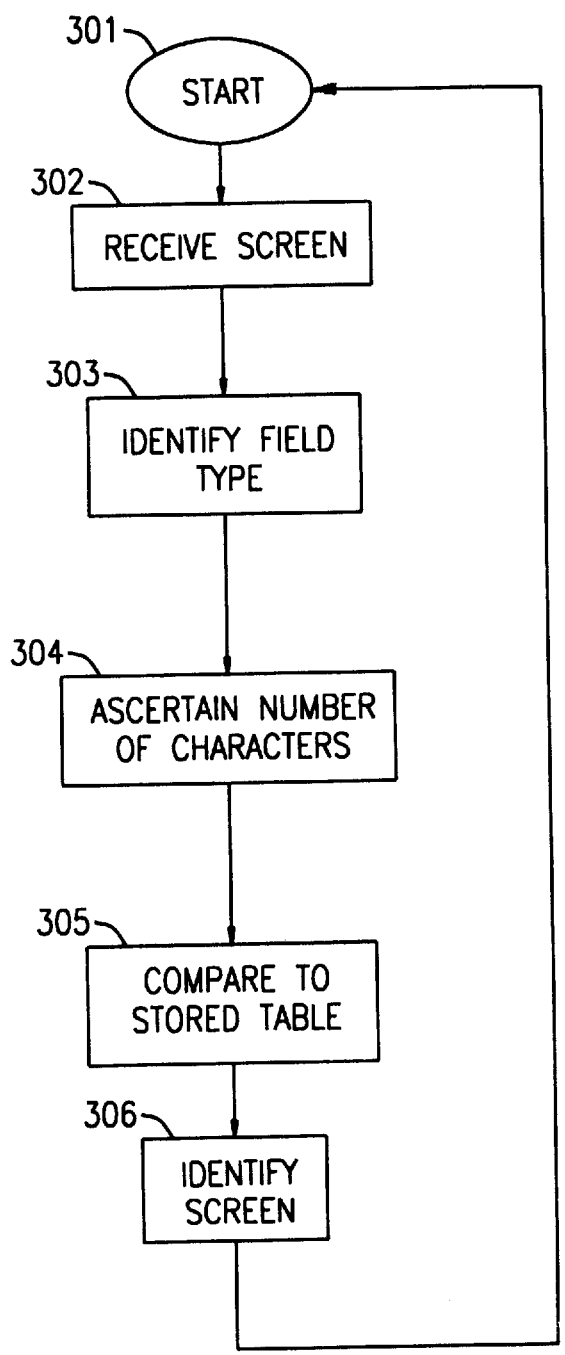
FIG. 3 shows a high level flow chart of a technique for use with the present invention.

With reference to FIG. 3, shown therein is a novel screen recognition algorithm which can be implemented in software on the PC. We will first describe one particular algorithm with reference to a flow chart while then detailing several other screen recognition methodologies which can be utilized in connection with the present invention. Since there are a large amount of such methodologies, only one exemplary flow chart is provided. It will be apparent however, based upon the following description, that the other techniques described hereafter may be implemented with some minor modifications to the flow chart.

The flow chart is entered at start 301, and a screen of information is received at the PC as indicated by block 302. The screen is in the form of a bit stream, which is parsed so that the different types of fields are identified. Fields may be literal, data entry, unused, or other, such as binary. A particular type of field, such as literals, is identified at block 303 and the number of characters contained in literal fields is ascertained at block 304. Of course, this processing requires minimal time and does not slow the system down to any noticeable degree.

The total character count contained within literal fields is utilized as an identification number for the screen. The ID number is compared to a table at block 305 and the table then identifies the particular screen, based upon the count utilized, at block 306. The particular screen identified corresponds to a set of user interface parameters which are loaded into the PC and utilized to determine how to display the screen to the user. For example, the table may include a plurality of records where each record comprises a set of display parameters such as a (i) screen color, (ii) tabbing order, (iii) text size, or (iv) any other feature which the PC user wishes to define. The generated ID is matched to the record in the table containing that ID, and the remainder of the record contains any and all information required to customize the screen display.

By utilizing the total number of characters contained within literal fields, rather than the screen ID generated by the mainframe computer, the PC is able to identify applications which have been changed (e.g.; by adding literals) even though the same screen ID number is maintained by the mainframe application. This is because if the applications program is at all changed, the change will result in the literal fields having a different number of characters than was the case prior to such change. Thus, if the applications program is changed, the PC can react by, for example, displaying the new screen in a default format or prompting the user to define a format for the display thereof.

While the flow chart of FIG. 3 represents a particular technique of processing the screen information downloaded from the mainframe computer, numerous other techniques are available which will be described hereafter. The basic idea however, is to analyze some combination of the types of data fields and/or data within such fields in order to calculate a screen ID at the PC. Moreover, if the information being downloaded contains screen attributes, (e.g.; bold, underline, mask), then the attributes of each field can also be used to identify the screen.

Hereafter, we will only briefly describe each of a plurality of different types of techniques which may be used to identify a screen downloaded from a mainframe computer. Since all of these techniques involve simply processing the different fields received as part of the screen, each is easily implemented by simply coding the appropriate software into the personal computer terminal emulator.

In one embodiment, the screen ID is generated by the PC simply counting the number of fields contained in the screen. The fields counted may include all fields, or a particular type of fields such as literals, data, unused fields, etc., or a combination thereof. Presuming that the screens generated by the mainframe applications each having different number of fields contained therein, the number of field of any one type, or the total number of fields, should be sufficient to uniquely identify the screen in most cases. In those cases in which two different screens may generate the same screen ID, a further hashing algorithm can be utilized in order to uniquely identify the screen. For example, the screen could be recognized by adding the total number of fields to the number of literals.

A second technique involves utilizing ratios of different types of fields contained within the screen. For example, a particular screen may contain several fields which are literals, several fields which are for data entry, and several fields which are unused. An ID can be generated by utilizing the ratio of literal fields to data entry fields, or data entry fields to unused fields or even utilizing a combination of ratios based upon the different types of fields. Any combination of a ratio of any one or more particular types of fields to any one or more other types of fields will be sufficient to establish a unique screen ID in most cases.

An additional technique involves utilizing the number of characters contained in particular fields. For example, the PC can simply count the total number of characters contained in data entry fields, or the total number contained in unused fields, etc. in order to arrive at a unique screen ID. Combining this embodiment with the previous technique described, the PC could count the number of total characters contained in one or more types of fields, and then compute a ratio or other mathematical function of these numbers in order to arrive at a particular number which may be used as a screen ID.

A still further technique of utilizing the fields to generate screen IDs involves utilizing the content of literal fields to establish a unique screen ID. Specifically, a value (e.g; ASCII) can be assigned to each character in the field and these values can be added together, or "hashed" in some other fashion in order to generate a unique screen ID. Additionally, this total value of the contents of each data field can be compared with any of a variety of other items (number of literal fields, number of data entry fields, etc.) in order to generate a ratio or other function to be utilized as the screen ID.

Still a further technique involves assigning attribute numbers to different attribute field contents. The attribute field contents can then be utilized in conjunction with the other values described hereinbefore in order to calculate a screen ID.

An additional technique utilizes a combination of the ASCII value of a character and its position in order to generate a number. For example, the values 1 through 256 could be assigned to the possible characters in the first screen position, the values 257 through 512 are assigned to the possible values in the second position on the screen, etc. Thereafter, the values of each character, which includes information about the particular character as well as its position on the screen, can be added in order to arrive at a screen ID.

Indeed, one can replace blocks 303 to 304 in FIG. 3 with any of dozens of different screen identification techniques. In the interest of brevity we will simply list several other techniques which could be used. For example, the screen could be identified by comparing, in the form of a ratio, the number of characters within a particular type of field to any of the following five items: (i) the number of literal fields, (ii) the number of data entry fields, (iii) the number of both data entry and literal fields, (iv) number of unused fields, and (v) total number of fields. Of course, any combination of the above or mathematical functions other than ratios may be utilized.

Additionally, one could establish the "contents" of each field by assigning an ASCII number to that field and that adding all the ASCII numbers. These ASCII numbers could then be utilized as a part of a ratio or other mathematical function, in conjunction with other items to identify the screen, such other items could comprise the number of literal or other type of fields, or some combination thereof.

The above describes several preferred embodiments of the invention, but various others will be readily ascertainable to those of ordinary skill in the art.

We claim:

1. In a system comprising a host computer and a plurality of terminal emulators, a method of identifying screens of information transmitted between the remote computer and the terminal emulator comprising the steps of:

identifying, at the terminal emulator, a number of fields contained within a screen of information transmitted from said mainframe to said emulator;

determining, based upon said number, which one of a plurality of screens has been received by said terminal emulator.

2. The method of claim 1 wherein the number of fields comprises one or more of the following: (i) number of data entry fields, (ii) number of unused fields, (iii) number of literal fields.

3. The method of claim 1 further comprising the step of forming a ratio between the number of fields of a first type and the number of fields of a second type.

4. The method of claim 1 further comprising the step of counting a number of characters comprised within each field of a particular type.

5. The method of claim 1 further comprising the step of forming a ratio between the number of characters within a particular field and the number of fields of a particular one or more types.

6. The method of claim 1 further comprising the step of ascertaining the content of each of a particular one or more types of fields, and calculating a mathematical function of said contents.

7. The method of claim 1 further comprising the step of forming a ratio between the content of a particular one or more types of fields, and the number of one or more types of fields.

8. The method of claim 1 further comprising the step of calculating a value corresponding to attributes associated with said field, and using said calculation to uniquely identify a screen.

9. The method of claim 1 further comprising assigning to each character position within a particular one or more types of fields a position number and value, and calculating a screen ID based upon said position numbers and said values.

* * * * *